United States Patent Office 3,369,398
Patented Feb. 20, 1968

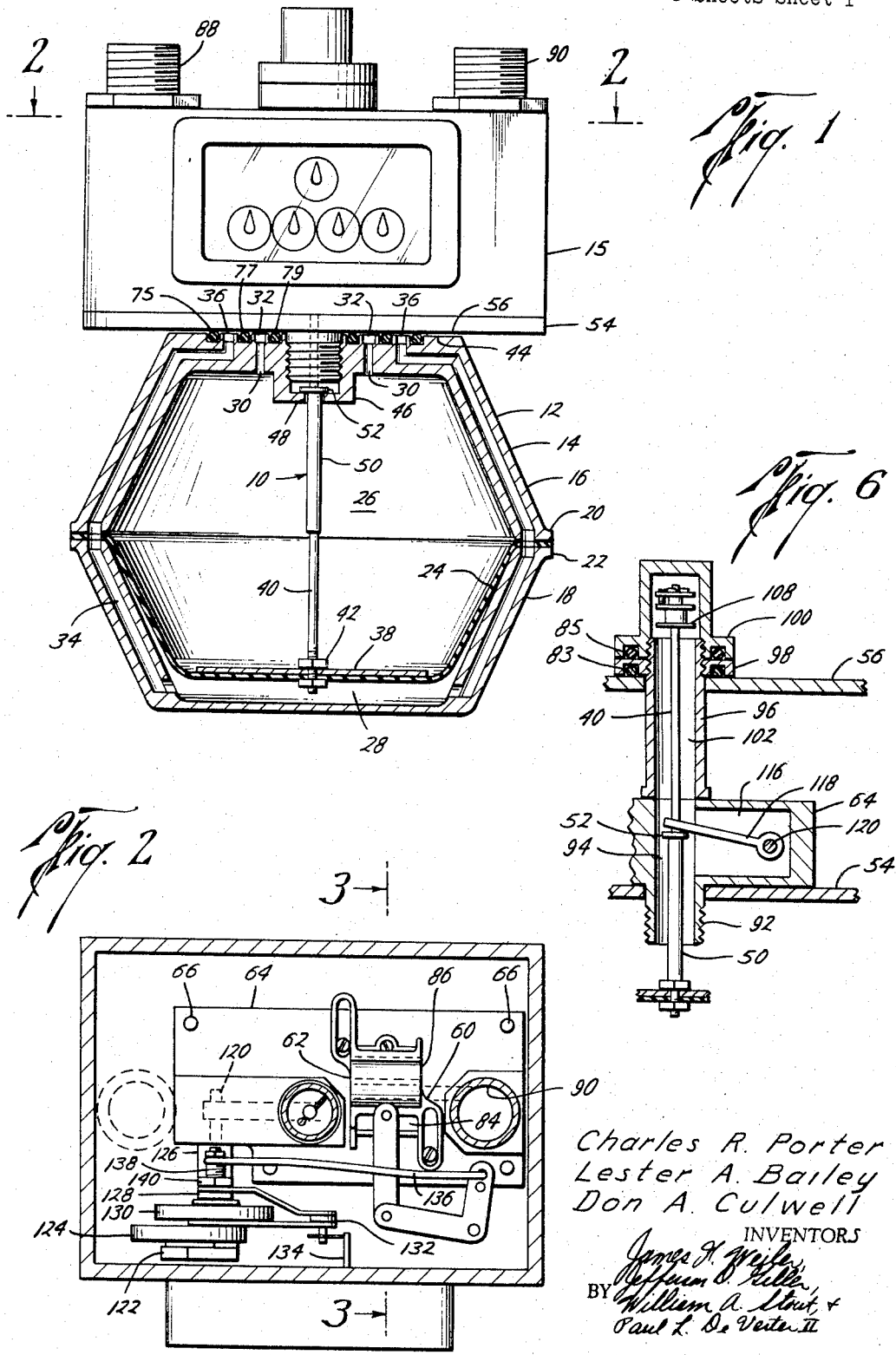

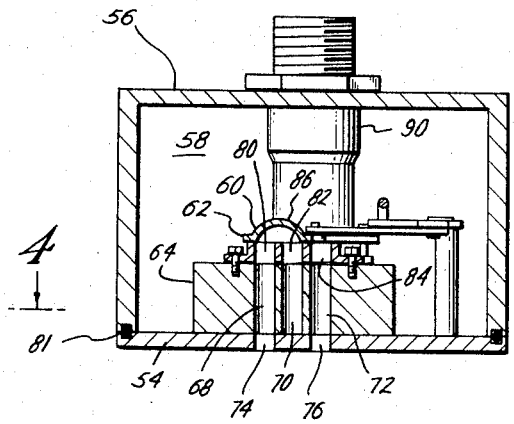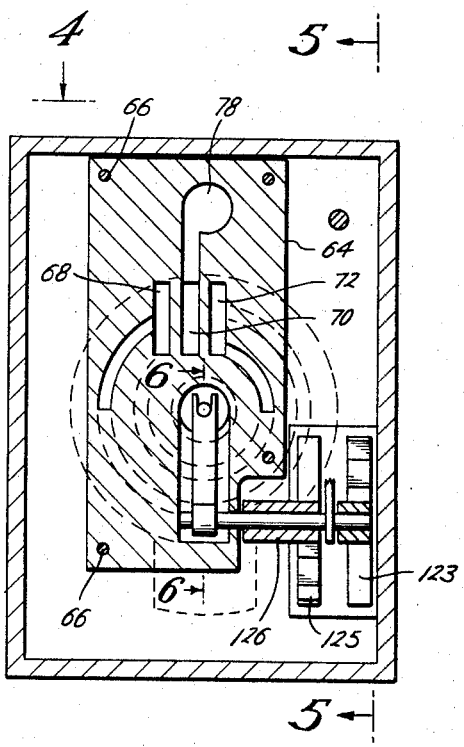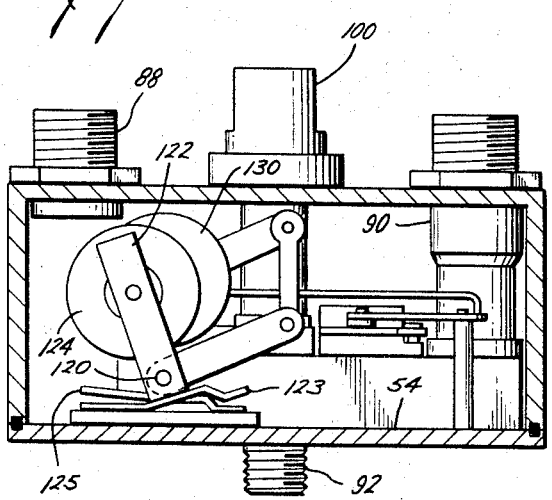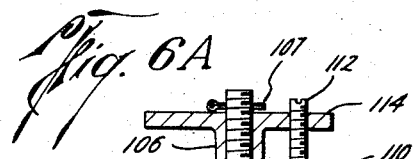
Charles R. Porter
Lester A. Bailey
Don A. Culwell
INVENTORS
ATTORNEYS

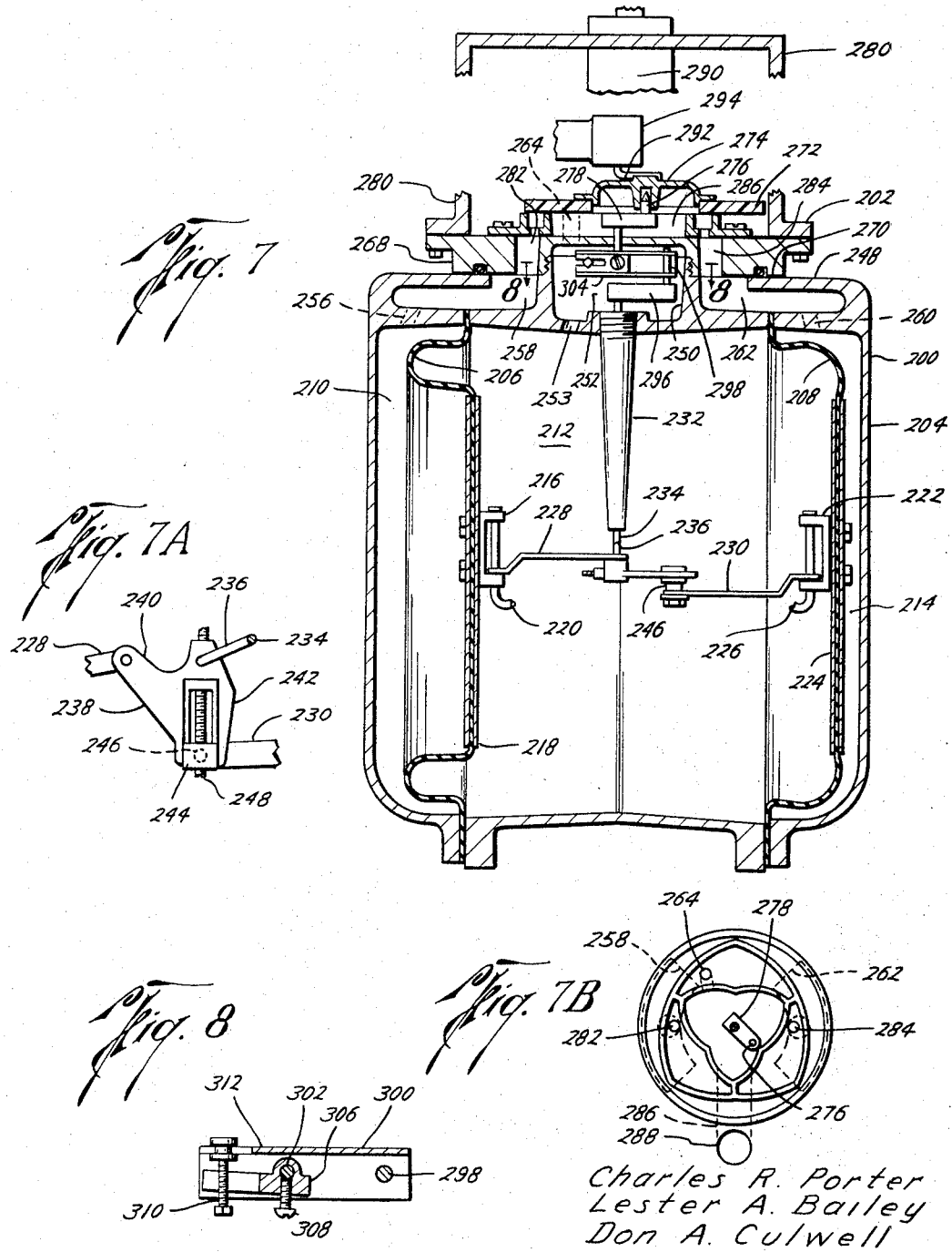

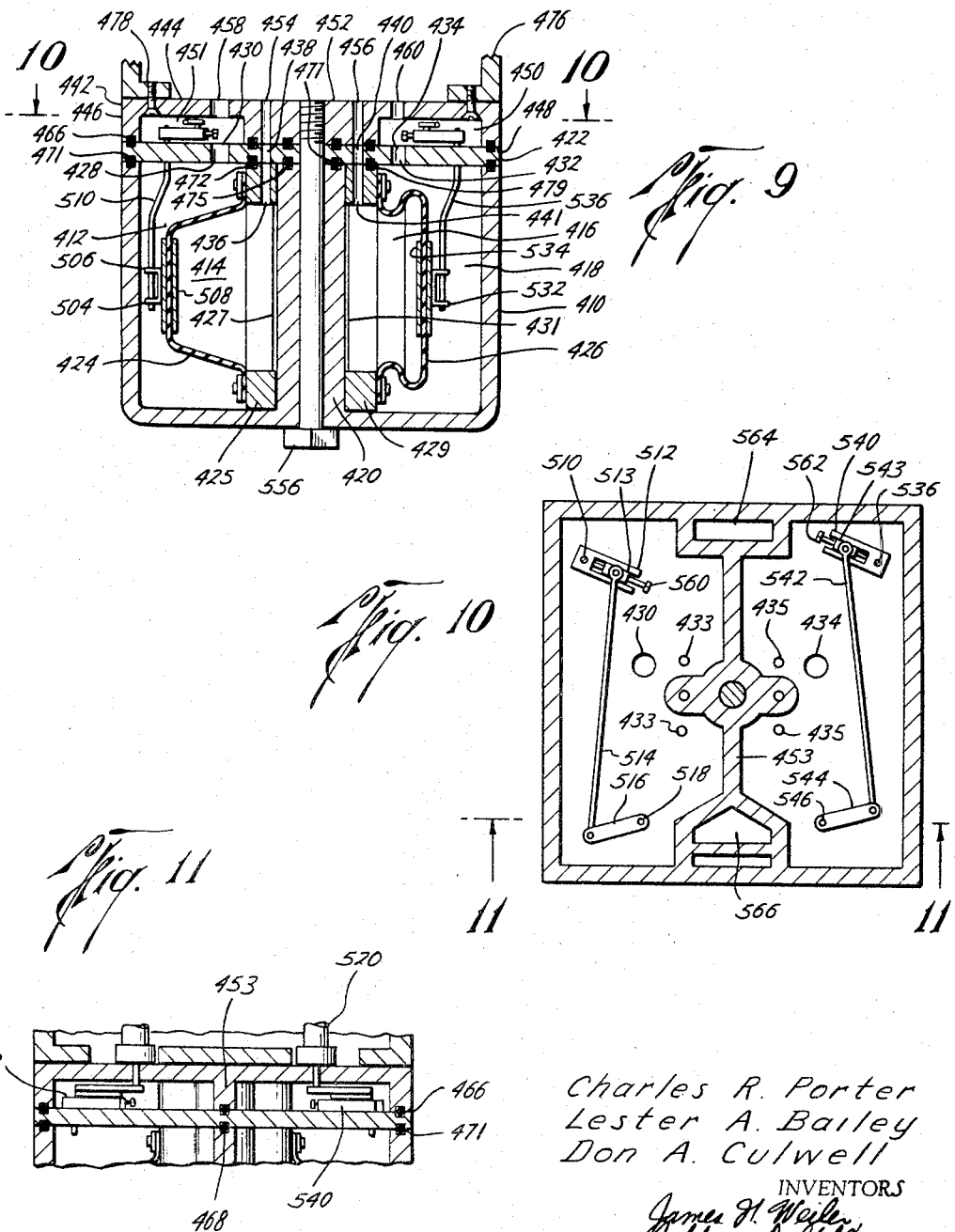

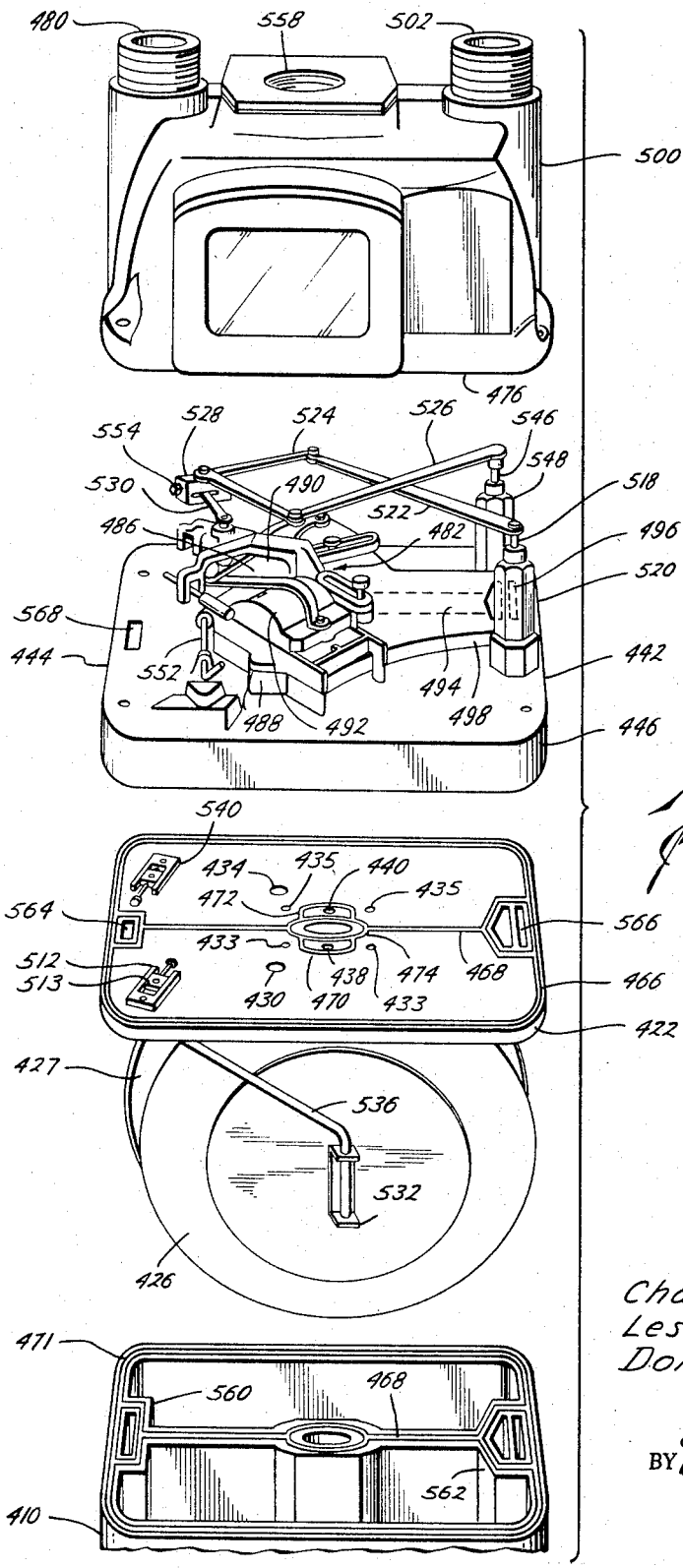

3,369,398
GAS METER
Charles R. Porter, Lester A. Bailey, and Don A. Culwell, Houston, Tex.; said Porter assignor, by direct and mesne assignments, of $19/560$ to D. R. Bernard; $1/28$ each to J. R. Curbo, Shelby E. Liss, George Morte, L. G. Myers, A. H. Rabensburg, and J. B. Richardson, all of Houston, Tex.; and $1/560$ to D. M. Johnston, Arlington, Mass.
Filed Apr. 6, 1964, Ser. No. 366,213
4 Claims. (Cl. 73—270)

This invention relates to gas meters and more particularly to improved positive displacement gas meters.

In general positive displacement gas meters include a case having a pair of gas metering chambers separated by a movable diaphragm. Through various types of valve means incoming gas is directed to one of the metering chambers while gas is simultaneously drained from the other metering chamber causing the diaphragm to move from the filling metering chamber toward the emptying metering chamber. Upon a predetermined amount of movement of the diaphragm the valve means is actuated to reverse the gas flow to and from the metering chambers which causes the diaphragm to move in an opposite direction. Linkage between the diaphragm and the valve means causes this operation of the valve means. Each time a metering chamber is emptied or filled a recording mechanism is actuated which converts the movement of the diaphragm into cubic feet on a dial. The diaphragms thus both actuate the valve means and displace the correct amount of gas.

One of the most common causes of difficulty with positive displacement meters, such as the common house gas meter, is inaccuracy in metering because of difficulty with the diaphragms. The diaphragms deteriorate so that they leak and they stiffen or deformations become fixed in them so that they do not displace the correct amount of gas. When the diaphragms of present meters become faulty it is normally necessary for a repairman to remove the complete meter from the line, replace it with another complete meter, and take the defective meter to a shop for disassembly and repair.

It is a general object of the present invention to provide a meter in which a defect due to faulty diaphragms may be corrected by an ordinarily trained serviceman without the necessity of removing the entire meter from the line.

Because of variations in the diaphragms and the valve operating linkage connected to the diaphragms, and for various other reasons, it is necessary that each gas meter have the gas metering chambers calibrated to be accurate.

It is another object of the present invention to provide a meter in which the gas metering chambers are precalibrated and which includes a case assembly that may be quickly and easily removed and replaced without the necessity of calibration at the time of installation. The defective case assembly may be either discarded or repaired.

It is a still further object of the present invention to provide such a meter having a horizontally mounted single diaphragm.

Other and further objects, features and advantages will be apparent from the following description of the presently preferred examples of the present invention, given for the purpose of disclosure and taken in conjunction with the accompanying drawings, where like character references designate like parts through the several views and where:

FIGURE 1 is a front elevation, partially sectional, of a single diaphragm meter utilizing the present invention, FIGURE 2 is a view along the line 2—2 of FIGURE 1, FIGURE 3 is a view along the line 3—3 of FIGURE 2, FIGURE 4 is a view along the line 4—4 of FIGURE 3, FIGURE 5 is a view along the line 5—5 of FIGURE 4, FIGURE 6 is an enlarged sectional elevation of a portion of the valve operating linkage illustrating, among other things, a means of precalibration, FIGURE 6A is an enlarged sectional elevation of the precalibration means of FIGURE 6, FIGURE 7 is a sectional elevation of another form of meter, this meter having three gas chambers and two diaphragms, FIGURE 7A is an enlarged view of the precalibration mechanism of FIGURE 7, FIGURE 7B is a plan view of the valve seat of FIGURE 7, FIGURE 8 is a view along the line 8—8 of FIGURE 7, FIGURE 9 is a sectional elevation of the case of another form of meter, this meter having four gas chambers and two diaphragms, FIGURE 10 is a view along the line 10—10 of FIGURE 9, FIGURE 11 is a view along the line 11—11 of FIGURE 10, and FIGURE 12 is an exploded perspective view of the meter of FIGURE 9.

Referring now to FIGURE 1, the gas meter as a whole includes a case assembly 12, a gas distributing and valve assembly 15 releasably secured on top of the case assembly, and valve element operating linkage (indicated generally by the numeral 10) connecting a diaphragm 24 with a movable valve element 62.

The case assembly 12 includes a case 14 in the form of a hexagonal solid for ease of construction and which has an upper portion 16 and a lower portion 18 secured together at a pair of mating flanges 20 and 22 by a series of rivets, not shown. Within the casing 14 is the movable and flexible diaphragm 24 horizontally secured to the periphery of the case 14 at the flanges 20 and 22 and forming a first or upper gas metering chamber 26 above the diaphragm 24 and a second or lower gas metering chamber 28 below the diaphragm 24.

Communicating between the first metering chamber 26 and the exterior of the case 14 are passageways 30 terminating in an annular port 32 at the exterior of the upper side of the casing 14. A passageway 34 communicates between the second metering chamber and the exterior of the upper end of the casing at an annular port 36.

The diaphragm 24 includes a diaphragm plate 38 to which a vertical diaphragm rod 40 is secured by a pair of diaphragm nuts 42. Extending inwardly from the upper surface 44 of the case 14 is an internally threaded boss 46 having an opening 48 through it at its lower end. The diaphragm rod 40 extends loosely through this opening 48 and upwardly into the gas distributing and valve assembly 15. Slidably mounted on the diaphragm rod 40 is a sleeve 50 which slidably extends through the opening 48 and carries at its upper end a shoulder 52 forming a contact. This shoulder 52 prevents the sleeve 50 from falling through the opening 48 into the casing 14.

Referring now to FIGURES 1, 2, 3, and 5, the gas distributing and valve assembly 15 includes a plate 54 having a lower surface 56 adjoining and mating the upper surface 44 of the case assembly 12. Secured on top of the plate 54 is a conventional cover 56 which together with the plate 54 forms a gas delivery chamber 58. Mounted on the plate 54 and within the delivery chamber 58 are valve means 60 which include a conventional D valve 62 mounted on a valve block 64 secured to the upper surface of the plate 54 by bolts 66 (FIGURE 4).

Through the valve block 64 are three adjacent vertical passageways 68, 70 and 72, respectively. The lower end of one outside passageway 68 communicates with a semi-annular passageway 74 cut through the plate 54 and the other outside passageway 72 communicates at its lower end with another semi-annular passageway 76 through the plate 54. When the plate 54 is mounted on the case 14 as illustrated in FIGURE 1 the annular passage 74 in the plate 54 communicates with the port 36 in the case 14 and the semi-annular passageway 76 communicates with the port 32 in the casing 14.

The middle passageway 70 is closed at its lower end by the plate 54 but with a vertical cylinder 78 having an open upper end at the upper surface of the valve block 64. The D valve 62 has three ports 80, 82, and 84 aligned with the passageways 68, 70, and 72 respectively. Slidably mounted over the valve ports 80, 82, and 84 is a slidably valve cover 86 forming a movable valve element operable between first and second positions. In the first position the cover 86 uncovers the port 80 and covers both ports 82 and 84 so that gas can enter the port 80 from the chamber 58 and gas in the upper gas chamber 26 within the casing 14 can drain through the passageways 76 and 72, pass under the cover 86, enter the passageway 82, and flow into the cylinder 78. In the second position of the valve cover 86, the port 84 is uncovered and open to gas within the chamber 58 while both ports 80 and 82 are covered. In this position gas in the lower chamber 28 of the casing 14 can drain through the passageways 74 and 68, pass through the port 80, under the valve cover 86, through the port 82, through the passageway 70 and into the cylinder 78.

Gas is admitted into the interior of the housing 56 through an externally threaded nipple 88 (FIGURE 5) connected to a gas supply, not shown, forming with the chamber 58 a gas passageway to constantly supply gas to whichever of the ports 80 or 84 of the D valve 62 is uncovered. The housing 56 also carries a stub of tubing 90 which is connected to and extends through the upper portion of the housing 58 and is threaded to be connected to the gas piping, not shown, to a house. The lower portion of this pipe stub 90 slidably and sealingly fits into the cylinder 78 in the valve block 64 when the housing 56 is lowered into place forming a passageway for gas to leave the valve 62. Thus the gas supply to and gas drain from the valve means 60 are separated from the case 14.

Sealing means such as the O-rings 75, 77, and 79 at the upper surface 44 of the case 14, an O-ring 81 between the cover 56 and the plate 54, and the O-rings 83 and 85 at the lock nut 98 and the cap nut 100 prevent the escape of gas from between the passageways leading between the case assembly 12 and the gas distributing and valve assembly 15 and from under the cover 56.

Formed on the lower surface of the valve block 64 is an externally threaded boss 92 (FIGURE 6) which, by threading into the boss 46 in the case 14 joins the case assembly 12 and the gas distributing and valve assembly 15 together. The boss 92 and valve block 64 are drilled to form a cylinder 94. Secured to the valve block 64 in alignment with the cylinder 94 is a tube 96 projecting through the top of the cover 56. The upper end of this tube 96 is externally threaded and receives a lock nut 98 which secures it to the cover 56. Also secured to the tube 96 at its upper end is a hollow cap nut 100. As thus constructed the cylinder 94, the tube 96, and the cap nut 100 all form a continuous cylinder 102 within which the diaphragm rod 40 and the sleeve 50 reciprocate vertically.

Means to precalibrate the gas chambers 26 and 28 are provided at the upper end of the diaphragm rod 40. Referring now to FIGURE 6A, the upper end of the rod 40 is externally threaded with the threads terminating at a shoulder 102. An internally threaded lower spool 104 threadedly receives an externally threaded upper spool 106. The lower spool 104 has a lower lip 108 which serves as a contact, as later explained, and a guide for movement of the rod 40 within the cylinder 102. This lower spool 104 also carries an upper lip 110. The upper spool 106 is threaded into the lower spool 104 the desired distance and then locked in that position by a set screw 112 threadily secured through a lip 114 on the upper spool 106 to lock the upper spool 106 and lower spool 104 in relation to each other.

The upper spool 106 is internally threaded to match the threads on the diaphragm rod 40. When in use the upper spool 106 is threaded onto the rod 40 until its lower end contacts and bears against the shoulder 102 and is locked in position by a cotter key 107 through the rod 40. Thus by adjusting the distance between the lips 110 and 114 the distance between the contact or lip 108 and the contact 52 on the sleeve 50 can be adjusted.

The valve block is also bored to form a rock arm chamber 116 which opens onto the cylinder 102. Within the rock arm chamber 116 is a rock arm 118 having one end secured to and operating a rock shaft 120 rotatably extending from the rock shaft chamber to the exterior of the valve block 64. The other end of the rock arm 118 is forked and straddles the diaphragm rod 40. Upward movement of the diaphragm rod 40 causes the contact 52 on the sleeve 50 to bear against the rock arm 118 and move it upwardly and likewise downward movement of the diaphragm rod 40 brings the contact 108 to bear against the end of the rock arm 118 and move it downwardly causing the rock shaft 120 to oscillate.

The outer end of the rock shaft 120 (FIGURES 2, 4, and 5) is secured to a vertical rock arm 122 which in turn is secured to and carries with it a disc shaped permanent magnet 124 so that oscillating movement of the rock shaft 120 moves the permanent magnet 124 forward and back in a slight arc. Rotatably mounted on the rock shaft 120 is a housing 126 to which is secured a vertical rock arm 128 in turn secured to a permanent magnet 130 mounted parallel to and adjacent the other permanent magnet 124. These two magnets 124 and 130 have poles at their flat faces and are mounted so that like poles are adjacent each other. Thus, as the magnet 124 is moved by the rock shaft 120 past central alignment with the magnet 130 the repelling force of the magnets will cause the magnet 130 to snap in an arc shaped motion parallel to but in opposite direction to the path of movement of the magnet 124. Upon reversal of movement of the magnet 124 through oscillation of the rock shaft 120 the magnet 130, once the magnet 124 has passed its midpoint, will be snapped in the opposite direction. After the magnet 124 has moved the desired distance in either direction it is stopped by the stop arm 123 connected to the rock arm 122 coming to bear against the top of the plate 54. Movement of the other magnet 130 is similarly limited by the stop arm 125 secured to the lower end of the rock arm 128.

This movement of the magnet 130 does two things. First, through the indicator linkage 132 it operates a conventional volume indicator means 134. Second, through subsidiary linkage 136 connected to the cover 86 of the D valve 62 it operates the cover 86 of the valve means 60 as previously described.

Thus, the valve element operating linkage 10 includes the diaphragm rod 40, the sleeve 50, the precalibrating spools 104 and 106, the rock arm 118, the rock shaft 120, the magnets 124 and 130 and the subsidiary linkage 136.

As is conventional in gas meters a valve timer is provided. A valve timer is a device which adjusts the valve position with respect to movement of the linkage so that by adjustment of the valve timer the valve can be caused to work earlier or later with respect to movement of the linkage. In this instance a valve timer is provided by a mechanism which adjusts the space between the magnets 124 and 130. Closing the space between these two magnets causes the magnet 130, and hence the valve means 60, to operate earlier and widening the space causes the magnet 130 to operate later. An externally threaded bolt 138 threadily extends through the rock arm 128 and has an end secured to the magnet 130. By adjusting a nut 140 on the bolt 138 the distance between the magnets 124 and 130 can be varied.

In operation of the form of meter disclosed in FIGURES 1 through 6A the gas supply line is connected to the nipple 88 and a house line is connected to the stub 90. Gas entering through the nipple 88 flows into the gas delivery chamber 58 and enters whichever of the ports 80 or 84 of the valve means 60 is uncovered by the valve cover 86. If the port 80 is uncovered the gas flows downwardly through the plate 54 at the passageway 74 into the port 36 and the lower gas chamber 28 causing the diaphragm 24 to rise carrying with it the diaphragm rod 40. As the diaphragm 24 rises it will contact the lower end of the sleeve 50 causing it to rise and the contact 52 on the upper end of the sleeve 50 to bear against the rock arm 118 moving it upwardly. As the rock arm 118 moves upwardly it will rotate the rock shaft 120 causing the permanent magnet 124 to move. After it has moved past the midpoint of the permanent magnet 130 the permanent magnet 130 will move and operate the subsidiary linkage 136 causing the cover 86 on the D valve to move and uncover the port 84 but cover the ports 80 and 82. Gas will now flow through the port 84, the passageway 76 in the plate 54, enter the port 32, flow through the passageway 30, enter the upper gas measuring chamber 26, and force the diaphragm 24 downwardly. As the diaphragm 24 moves downwardly the gas in the lower gas metering chamber 28 will be exhausted out the passageway 34, the port 36, the passageway 74, through the valve ports 80 and 82 and into the stub 90 connected to the house line to complete the cycle. Upon each stroke of the diaphragm the indicator linkage 132 operates the volume indicator 134.

If the diaphragm 24 should become faulty a new case assembly 12 is substituted for the old one. When the case assembly 12 is made it is precalibrated by adjusting the distance between the contact 108 and the contact 52 when the contact 52 is in its uppermost position. By adjusting this distance the stroke of the diaphragm 24 necessary to operate the valve means is adjusted to a known standard volume. This distance is adjusted by raising or lowering the lower spool 104 on the upper spool 106 until the lower contact 108 is at the desired distance from the contact 52 when the lower end of the upper spool 106 abuts against the shoulder 102 near the upper end of the diaphragm rod 40. When this position has been determined the upper and lower spools 106 and 104 respectively are locked in relation to each other by the set screw 112.

The gas to the meter to be repaired is turned off. The cap nut 100 is removed and the diaphragm rod is raised to the upper end of the tube 96 by any convenient tool which will reach into the upper end of the tube 96. The cotter key 107 is removed and the spools 104 and 106 unthreaded from the diaphragm rod 40. The lower case assembly 12 is then unthreaded from the gas distributing and valve assembly 15 and discarded. The previously calibrated case assembly 12 is then threaded onto the boss 92 of the gas distributing and valve assembly 15 until the upper surface 44 of the case 14 and the lower surface 56 of the plate 54 snugly abut one another. The upper and lower spools 104 and 106 of the new diaphragm rod 40 are now threaded snugly onto it and the cotter key 107 and the cap nut 100 replaced. The repair is now finished.

Referring now to FIGURES 7, 7A, 7B, and 8, there is illustrated there another form of meter constructed in accordance with the present invention which differs from that form of meter illustrated in FIGURES 1 through 6 principally in that it has two vertical diaphragms rather than a single horizontal diaphragm, it utilizes three rather than two gas metering chambers in the case assembly, and the valve is a disc type valve operated by rotational movement rather than a reciprocating movement.

The meter of FIGURE 7 includes as a whole a case assembly 200 and a gas distributing and valve assembly 202. The case assembly 200 includes a metallic case 204 in which are located a first movable flexible diaphragm 206 and a second such diaphragm 208 mounted vertically entirely within the case 204 and spaced from one another. These form a first gas metering chamber 210 on the left side of the case 204 as viewed in FIGURE 7, a second or middle gas metering chamber 212, and a third or right-hand gas metering chamber 214. The diaphragm 206 has a diaphragm bracket 216 connected to a diaphragm plate 218 forming a part of the diaphragm 206. Rotatably mounted in this diaphragm bracket 216 is a carrier wire 220 secured to a bracket, not shown, on the interior of the case 204 within the gas chamber 212 so as to give vertical support to the diaphragm 206 while allowing it to move from right to left as viewed in FIGURE 7. The diaphragm 208 is likewise supplied with a diaphragm bracket 222 secured to a diaphragm plate 224 which is part of the diaphragm 208. Rotatably mounted in this diaphragm bracket 222 is a carrier wire 226 connected to a bracket, not shown, on the case 204 to give vertical support to the diaphragm 208 while allowing it to move from left to right.

Pivotally secured to the diaphragm bracket 216 is one end of a diaphragm link or connecting member 228 and pivotally connected to the other diaphragm bracket 220 is one end of another diaphragm link or connecting member 230. Threadily secured into an opening in the upper portion of the gas chamber 212 is a vertical guide bushing 232 through which rotatably extends a crank shaft 234 having at its lower end a crank arm 236. The end of the crank arm 236 extending from the crank 234 is turned downwardly and rotatably journaled into a diaphragm plate 238. The diaphragm plate 238 includes an arm 240 to which is rotatably journaled an end of the diaphragm link 228. The diaphragm plate 240 also includes a forked arm 242 carrying a sliding block 244 to which is rotatably secured one end of the diaphragm link 230 by a depending stud 246. The plate 244 is movable toward and away from the crank arm 236 by turning the elongate screw 248 which is threaded into the diaphragm plate 238. This screw 248 may be adjusted through a closable opening, not shown, in the case 204 and by adjustment of this screw 248, and hence of the plate 244, the length of the connecting member 230 and the amount of movement of the diaphragm 208 upon one rotation of the crank shaft 234 is adjusted. This calibrates the meter.

The construction and operation of the case assembly as heretofore described is conventional in meters made by the Sprague Meter Company, Bridgeport 1, Conn., and as disclosed in Patent No. 1,892,520 issued Dec. 27, 1932 for a "Gas Meter."

The upper end of the case 204 is a flat surface 248 from which projects an externally threaded hollow boss 250 forming a portion of a crank arm chamber 252 which crank arm chamber also serves as a port connecting with a gas passageway 253 to the middle gas metering chamber 212. A gas passageway 256 communicates between the left-hand gas metering chamber 210 and a semi-annular port 258 at the upper end of the case 204. Similarly a gas passageway 260 communicates between the right-hand gas metering chamber 214 and a semi-annular port 262 at the upper end of the case 204. Threadily secured to the case 204 at the surface 248 by means of the threads matching the threads on the boss 250 is a plate 268 having a lower surface 270 mating the upper surface 248 of the case 204. Secured to the top of the plate 268 is a disc type valve 272 having movable valve means in the form of a valve cover 274 which valve cover 274 is caused to move in a circle by a drive pin 276 on the end of a crank arm 278. Upon rotation of the valve cover 274 gas within the housing 280 for the gas distributing valve assembly 202 is successively directed to a passageway 282 in the plate 268 in communication with the port 258, a passageway 264 in communication with the port 252, and through a passageway 284 through the plate 268 in communication with the port 262 in the casing 204 while simultaneously gas is drained from one of the gas metering chambers 210, 212 and 214 not being filled. This drainage is through the valve 272 and out an exhaust passageway 286 terminating in an upstanding open ended cylinder 288 in communication with the pipe stub 290 which is connected through the housing 280 to the house line, not shown. Upon each rotation of the valve cover 274 a shaft 292 carried by the valve cover 274 operates conventional volume indicating mechanism 294.

The construction and operation of that portion of the gas distributing and valve assembly 202 above the plate 268 is conventional, is fully described in Patent No. 722,390 issued Mar. 10, 1903 for a "Gas Meter" and no further description thereof is necessary.

Formed on that portion of the crank shaft 234 protruding from the guide bushing 232 into the crank chamber 252 is a crank arm 296 to the outside end of which is secured a vertical pin 298. This pin 298 is slidably and rotatably inserted into an opening in the valve timer 300 (FIGURE 8) which valve timer 300 is in the form of a crank arm and carries an extension 302 of the crank shaft 234. This extension 302 rotatably extends through the plate 268 and is connected in the exhaust passageway 286 to the crank arm 278 which operates the valve 272. The crank shaft extension 302 is journaled through a plate 304 of the timer 300 and secured to a rocking lever 306 by a screw 308. The rocking lever 306 carries an adjusting screw 310 rotatably secured to a plate 312 in the timer 300. Thus, turning the adjusting screw 310 advances or retards the crank shaft extension 302 and hence the operation of the valve 272 with respect to the crank shaft 234.

The valve operating linkage thus includes the connecting members 228 and 230, the diaphragm plate 238, the crank arm 236, the crank shaft 234, the crank arm 296, the pin 298, the valve timer 300, the extension 302, the crank arm, 278 and the drive pin 276.

In operation of the meter, FIGURES 7, 7A, 7B, and 8, gas entering the housing 280 passes through the valve 272, the passageway 282, the port 258, the passageway 256, and enters the first gas metering chamber 210. The valve 272 has previously drained gas from the middle gas metering chamber 212 through the passageway 253, the crank arm chamber 252, and exhaust passageway 286, and is draining gas from the third gas metering chamber 214 through the passageway 260, the annular port 262, the passageway 284, the exhaust 286 and out the stub 290 to the house line.

As the first gas metering chamber 210 fills it moves the diaphragm 206 to the right carrying with it the connecting member 228 which rotates the crank shaft 234. This movement of the crank shaft moves the valve cover 274 to its next position causing ports through the valve 272 to be closed to the first metering chamber 210 and opening ports in the valve 272 to the passageway 264, the crank arm chamber 252, and the passageway 253 into the center chamber 210 causing it to fill. The right-hand metering chamber 214 has already drained. This filling of the central chamber forces the right-hand diaphragm 208 to move to the right and carry with it the connecting member 230 causing further rotation of the crank shaft 234 and hence of the diaphragm cover 274. Upon the center gas metering chamber 212 becoming full the valve cover 274 is in such a position that gas flows through the valve 272, the passageway 284, the port 262, and the passageway 260 into the right-hand gas metering chamber 214 causing it to commence filling while simultaneously the valve 272 permits draining of gas from the first gas metering chamber 210 out the stub 290. As the right-hand gas metering chamber 214 fills it moves the diaphragm 208 to the left carrying with it the connecting member 230 which causes rotation of the crank shaft 234 and hence of the valve disc 274. This same movement of the diaphragm 208 to the left also causes diaphragm 206 to move to the left as the gas is draining from the gas metering chamber 210 and the central gas metering chamber 212 is full.

Upon completion of filling of the right-hand gas metering chamber 214 the left-hand gas metering chamber 210 is empty and commences filling, the middle gas metering chamber 212 is empty, and the right-hand gas metering chamber 214 commences to empty, completing the cycle.

When it is desired to repair the meter to correct a faulty diaphragm, the gas in the supply line to the meter is turned off by a valve, not shown, and the case assembly 200 removed from the gas distribution and valve assembly 202 by simply unscrewing the case assembly 200 and slidably removing the pin 298 from the valve timer 300. A new precalibrated case assembly 200 is substituted in its place by first inserting the pin 298 in the valve timer 300 and then threading the boss 250 into the plate 268.

Referring now to the form of meter in FIGURES 9 through 12, the case assembly 408 has a case 410 in which are first, second, third, and fourth gas metering chambers 412, 414, 416, and 418 respectively with the first and the second metering chambers 412 and 414 being separated from the third and fourth metering chambers 416 and 418 by a rigid vertical partition 420 extending upwardly and terminating at a case cap 422 forming the upper end of the case assembly 408. The first and second gas metering chambers 412 and 414 are separated from each other by a flexible diaphragm 424 forming a common wall. Similarly the third and fourth metering chambers 416 and 418 are separated from each other by a flexible diaphragm 426. So that the diaphragms 424 and 426 may be removed from the case 410, the partition 420 is not a wall of the second and third metering chambers 414 and 416 respectively. Instead, the diaphragm 424 is secured to a cylindrical pan 425 having a back wall 427 adjacent to the partition 420. Similarly, the diaphragm 426 is secured to a cylindrically shaped pan 429 having a back wall 431 adjacent to the partition 420. The pan 425 is secured to the case cap 422 by bolts 433 and the pan 429 is secured to the case cap 422 by bolts 435. Thus, the pans 425 and 429 and the diaphragms 424 and 426 may be removed from the case 410 with the case cap 422 as shown in FIGURE 12.

A gas passageway 428 communicates between the first metering chamber 412 and a port 430 at the upper surface of the case 410 and a similar passageway 432 communicates between the fourth metering chamber 418 and a port 434 at the exterior of the upper end of the case 410. A passageway 436 extends from the second metering chamber 414 through the pan 425 to a port 438 at the upper surface of the case. Likewise, a passageway 441 communicates through the pan 429 between the third metering chamber 416 and a port 440 at the exterior of the case 410.

A gas distributing and valve assembly 442 includes a plate 444 having a peripheral depending lip 446 mating the upper surface 448 of the case cap 422 at the outer edge thereof and forming recesses 450 and 451 between the plate 444 and the case cap 422. Centrally located in the plate 444 are a web 453 separating the recesses 450 and 451 and a hollow internally threaded downwardly extending boss 452 containing a passageway 454 in communication with the port 438 and another passageway 456 in communication with the port 440. A passageway 458 through the plate 444 at the recess 451 communicates with the port 430. Another passageway 460 through the plate 444 communicates with the recess 450 and the port 434. Sealing means such as the O-rings 466, 468, 470, 471, 472, 473, 475, and 477 seal the recesses 450 and 451 from the exterior of the meter from each other and from the passageways 454 and 456 and the escape of gas from around the case cap 422.

A housing 476 is secured by bolts 478 to the plate 444. An externally threaded nipple 480 admits gas from a gas supply line, not shown, to the interior of the housing 476 which forms a gas distributing chamber.

Secured to the top of the plate 444 are valve means 482 which include a pair of D valves 486 and 488 respectively. Each of these D valves 486 and 488 are identical to the D valve illustrated in FIGURES 2, 3, 4, and 5 hereof. D valve 486 directs gas alternately to and from the passageways 456 and 460 and D valve 488 alternately directs gas to and from the passageways 458 and 454. This is done by movement of the covers 490 and 492 on the valves 486 and 488 respectively which covers form a movable element for the valve means 482. Gas leaving the valve means 482 passes from the valve means 482 through a common exhaust passageway 494 to an opening 496 in a valve block 498. Formed in the exterior wall of the housing 476 is a passageway 500 which, when the housing 476 is in place, communicates with the opening 496 and an externally threaded nipple 502 connected to a house line so that gas leaving the valve means 482 can pass to the house line.

The valve means 482 is caused to operate by valve operating linkage indicated generally by the numeral 504 (FIGURE 9) between the diaphrams 424 and 426 and the valve means 482. This linkage 504 includes a diaphragm bracket 506 secured to the diaphragm 424 at the plate 508, a flag rod 510 rotatably mounted in the diaphragm bracket 506 and rotatably extending through the case cap 422, a precalibrator 512 on the upper end of the flag rod 510 in the recess 451, a flag rod extension 514 connected to a slidable block 513 in the precalibrator 512 within the recess 451, a flag rod link 516 pivotally connected to the flag rod extension 514 also within the recess 451, a flag rod pin 518 slidably and rotatably inserted into the flag rod link 516 and extending upwardly through the plate 444 and through a packing gland 520, a horizontal lever 522 secured to the upper end of the flag rod pin 518, criss-cross horizontal linkage 524 connected to this horizontal lever 522 and another horizontal lever 526, a valve timer 528, and a crank 530 connected to and operating the covers 490 and 402 of the D valves 486 and 488 upon rotation of the crank 530.

This valve operating linkage 504 also includes a diaphragm bracket 532 secured to the diaphragm 426 at the plates 534, a flag rod 536 rotatably mounted in the diaphragm bracket 532 and rotatably extending through the case cap 422, a precalibrator 540 on the upper end of the flag rod 536 in the recess 450, a flag rod extension 542 connected to a slidable block 543 in the precalibrator 540 within the recess 450, a flag rod link 544 pivotally connected to the flag rod extension 542 also within the recess 450, a flag rod pin 546 slidably and rotatably inserted into the flag rod link 544 and extending upwardly through the plate 444 and through a packing gland 548.

In operation of the meter of FIGURES 9 through 12, the gas enters the nipple 480 and passes under the housing 476 to the valve means 482. It is first directed through the D valve 488, the passageway 454, the port 438, and the passageway 436 into the second metering chamber 414 while gas simultaneously drains from the first metering chamber 412 through the passageway 428, the port 430, the recess 451, the passageway 458, the exhaust passageway 494, the passageway 500, and out the nipple 502. This causes the diaphragm 424 to move to the left as viewed in FIGURE 9. At this time the third metering chamber 416 is empty and the fourth metering chamber 418 is filled and the passageways to those chambers are closed.

This movement of diaphragm 424 to the left causes the flag rod 510 to rotate through a portion of a complete revolution. This movement of the flag rod 510 turns the precalibrator 512 through an arc which moves the flag rod extension 514 and the flag rod link 516 causing the flag rod pin 518 to rotate a portion of a revolution also. This movement of the flag rod pin 518 moves the lever 522 and operates the valves 486 and 488 to permit gas to flow through the passageway 456, the port 440, and the passageway 441 into the third metering chamber 416. Simultaneously gas is permitted to drain from the fourth metering chamber 418, out the passageway 432, the port 434, the recess 450, the passageway 460, the valve 486, and out into the house line. This operation of the valves 486 and 488 also stops flow into and out of the first and second metering chambers 412 and 414.

As the diaphragm 426 moves to the right due to the filling of the third metering chamber 416 and the draining of the fourth metering chamber 418 the flag rod 536 is caused to rotate through a portion of a revolution which rotating motion passing through the precalibrator 540, the flag rod extension 542, the flag rod link 544, the flag rod pin 546, and the lever 526 operates the valve means 482 to again close the inlets and outlets to the third and fourth metering chambers 416 and 418 leaving the third metering chamber 416 filled and the fourth metering chamber 418 empty. It also allows gas to flow into the first metering chamber 412 and exhaust from the second metering chamber 414.

This filling of the first metering chamber 412 and emptying of the second metering chamber 414 causes the diaphragm 424 to move to the right and oscillate the flag rod 510 which in turn again operates the valve means 482 upon completion of the filling of the first gas metering chamber 412 and draining of the second metering chamber 414. This last mentioned operation of the valve means 482 closes the inlets and outlets to the first and second metering chambers 412 and 414 respectively, permits drainage of gas from the third metering chamber 416, and allows gas to flow into the fourth metering chamber 418 for the completion of the cycle.

The operation of the valve means as previously described operates a drive mechanism 552 adjacent the valve means 482 which drive means 552 operates a conventional volume indicating index, not shown.

The valve timer 528 mounted on the crank arm 530 adjusts the timing of the valve means 482 by a screw 554 which moves the crank arm 530 in relation to the criss-cross linkage 524. This adjustment may be made through the opening 558 (normally closed with a cap nut, not shown) at the top of the housing 476.

No further description of the operation of the valve means 482, the linkage between the flag rod pins 518 and 546, the operation of the volume recording apparatus, or the valve timer 530 is necessary as this is conventional construction and operation in such meters as the Rockwell No. 150 meter manufactured by Rockwell Manufacturing Company, Pittsburgh, Pa., and is described in Patent No. 2,544,665, issued Mar. 13, 1951, for a Gas Meter.

When a diaphragm in the case assembly 408 becomes defective the meter is repaired by unscrewing a bolt 556 extending from the bottom of the case 410 through the partition 420 and into the internally threaded boss 452. This allows the case 410, together with the case cap 422, the precalibrators 512 and 540, the flag rod extensions 514 and 542, and the flag rod links 516 and 544 to be removed from the remainder of the meter. The flag rod links 516 and 544 merely slide off the flag rod pins 518 and 546. A precalibrated case assembly 408 is then substituted for the one removed by inserting the flag rod pins 518 and 546 into the flag rod links 516 and 544 and replacing and securing the bolt 556. If desired, rather than utilizing an entire new precalibrated case assembly 408 the old case 410 may be used with new parts for the remainder of the case assembly 408 since the case 410 may be easily separated from the remainder of the case assembly 408 as illustrated in FIGURE 12.

The precalibrated case assembly was precalibrated by adjusting the distance between the end of each of the flag rod extensions 514 and 542 and the flag rods 510 and 536 by turning screws 560 and 562 and moving the slidable blocks 513 and 543 in the precalibrators 512 and 540 respectively.

Because the diaphragms 424 and 426 and the pans 425 and 429 together with the case cap 422 may be removed from the case 410 as a unit and like parts replaced in the case 410, the case 410 is provided with an inlet housing 560 open at its upper end and closed at its lower end and an outlet housing 562 also closed at its lower end and open at its upper end. The upper end of these housings 560 and 562 are flush with the upper end of the case 410. Through the case cap 422 is an opening 564 in line with the upper end of the inlet housing 560 and an opening 566 in line with the opening 562 in the outlet housing. Similarly, in the plate 444 is an opening 568 in line with the opening 464 and the opening 496 in the valve block 498 is aligned with the opening 566 in the case cap 422. By this construction, if desired, side connections for gas lines can be made to the form of the meter illustrated in FIGURES 9 through 12 rather than using the nipples 480 and 592 in the housing 476. This may be done by tapping the inlet housing 560 and the outlet housing 562 for inlet and outlet connections.

The invention is well suited to carry out the objects and attain the advantages and ends mentioned as well as others inherent therein. In addition, rearrangements and substitutions of parts will suggest themselves to those skilled in the art and such are encompassed within the spirit of the invention and the scope of the appended claims.

What is claimed is:
1. A gas meter comprising:
   (a) a case assembly including;
      (1) a case having first and second gas metering chambers therein,
      (2) a movable diaphragm in the case forming a wall of both metering chambers,
      (3) for each chamber, a gas passageway between that chamber and a port at the exterior of the case,
   (b) a gas distributing and valve assembly releasably secured to the case assembly and including;
      (1) a plate having a surface mating the exterior surface of the case at the ports, said plate being releasably secured to the case with the mating surfaces adjoining each other,
      (2) passageways through the plate in communication with the ports,
      (3) valve means having a movable valve element operable between the first and second positions, said valve means successively directing gas through the aforesaid passageways to one of the metering chambers and draining gas from the other metering chamber through the passageways upon operation of the movable valve element,
      (4) a gas supply passageway to and a gas drain passageway from the valve means, and
   (c) valve element operating linkage extending through the case and plate said linkage being actuated by movement of the diaphragm and having one end connected to the diaphragm and another end connected to the valve element, the linkage including;
      (1) a rod moved in a reciprocating movement by movement of the diaphragm,
      (2) spaced contacts carried by the rod,
      (3) means to adjust the effective distance between the contacts, and
      (4) a rock arm releasably connected to the rod and caused to move by bearing against the contacts on the rod.
2. The gas meter of claim 1 in which the gas distributing and valve assembly includes a valve timer.
3. The gas meter of claim 1 in which the diaphragm is horizontal.
4. The gas meter of claim 3 in which the gas distributing and valve assembly includes a valve timer.

References Cited

UNITED STATES PATENTS

| | | | |
|---|---|---|---|
| 1,901,178 | 3/1933 | Malm | 73—251 |
| 2,005,024 | 6/1935 | Diehl | 73—266 |
| 2,121,892 | 6/1938 | Stiner | 73—270 |
| 2,265,508 | 12/1941 | Blum | 73—251 |
| 2,860,513 | 11/1958 | Cheronnet | 73—251 |
| 2,296,485 | 9/1942 | Whitworth | 73—281 |
| 3,161,049 | 12/1964 | St. Clair et al. | 73—267 |

FOREIGN PATENTS

| | | |
|---|---|---|
| 17,995 | 9/1929 | Australia. |
| 394,794 | 5/1932 | Great Britain. |

RICHARD C. QUIESSER, *Primary Examiner.*

JAMES J. GILL, *Examiner.*

E. D. GILHOOLY, *Assistant Examiner.*

UNITED STATES PATENT OFFICE
CERTIFICATE OF CORRECTION

Patent No. 3,369,398　　　　　　　　　　　　February 20, 1968

Charles R. Porter et al.

It is certified that error appears in the above identified patent and that said Letters Patent are hereby corrected as shown below:

Column 9, line 46, for "402" read -- 492 --; column 11, line 24, for "592" read -- 502 --.

Signed and sealed this 24th day of June 1969.

(SEAL)
Attest:

Edward M. Fletcher, Jr.　　　　　　　　WILLIAM E. SCHUYLER, JR.
Attesting Officer　　　　　　　　　　　　　Commissioner of Patents